(12) United States Patent
Nishio

(10) Patent No.: US 6,463,378 B2
(45) Date of Patent: Oct. 8, 2002

(54) BRAKE CONTROL DEVICE FOR A VEHICLE

(75) Inventor: Akitaka Nishio, Okazaki (JP)

(73) Assignee: Aisin Seiki Kabushiki Kaisha, Kariya (JP)

(\*) Notice: Subject to any disclaimer, the term of this patent is extended or adjusted under 35 U.S.C. 154(b) by 0 days.

(21) Appl. No.: 09/910,767

(22) Filed: Jul. 24, 2001

(65) Prior Publication Data

US 2002/0010535 A1 Jan. 24, 2002

(30) Foreign Application Priority Data

Jul. 24, 2000 (JP) ........................................ 2000-222892

(51) Int. Cl.[7] ................................................ G06F 7/70
(52) U.S. Cl. ........................... 701/70; 701/78; 303/133; 303/155
(58) Field of Search ............................ 701/70, 78, 83; 303/133, 155, 139, 9.61; 188/181 R

(56) References Cited

U.S. PATENT DOCUMENTS 6,278,929 B1 \* 8/2001 Tosu et al. .................... 701/70

FOREIGN PATENT DOCUMENTS

EP 0 379 329 \* 7/1990

\* cited by examiner

*Primary Examiner*—Yonel Beaulieu
*Assistant Examiner*—Arthur D. Donnolly
(74) *Attorney, Agent, or Firm*—Burns, Doane, Swecker & Mathis, LLP

(57) ABSTRACT

A brake control device for a vehicle includes a brake pedal, vehicle wheels, wheel brake cylinders, an automatic hydraulic pressure generating device, a pressure control valve unit, and an automatic brake control unit for controlling the pressure control valve unit in response to a vehicle driving condition. The brake control device for the vehicle regulates any of the pressure control valve unit corresponding to the wheels in response to the brake pedal operation when the automatic brake control is performed under the brake pedal being operated. Therefore, the brake control device resembles the brake hydraulic pressure of the wheel brake cylinders corresponding to the controlled pressure control valve to the brake pedal depression. The brake control device generates a vehicle deceleration in response to a brake pedal operation when an automatic brake pressure increase control is performed at any of the vehicle wheels when the brake pedal is operated.

18 Claims, 11 Drawing Sheets

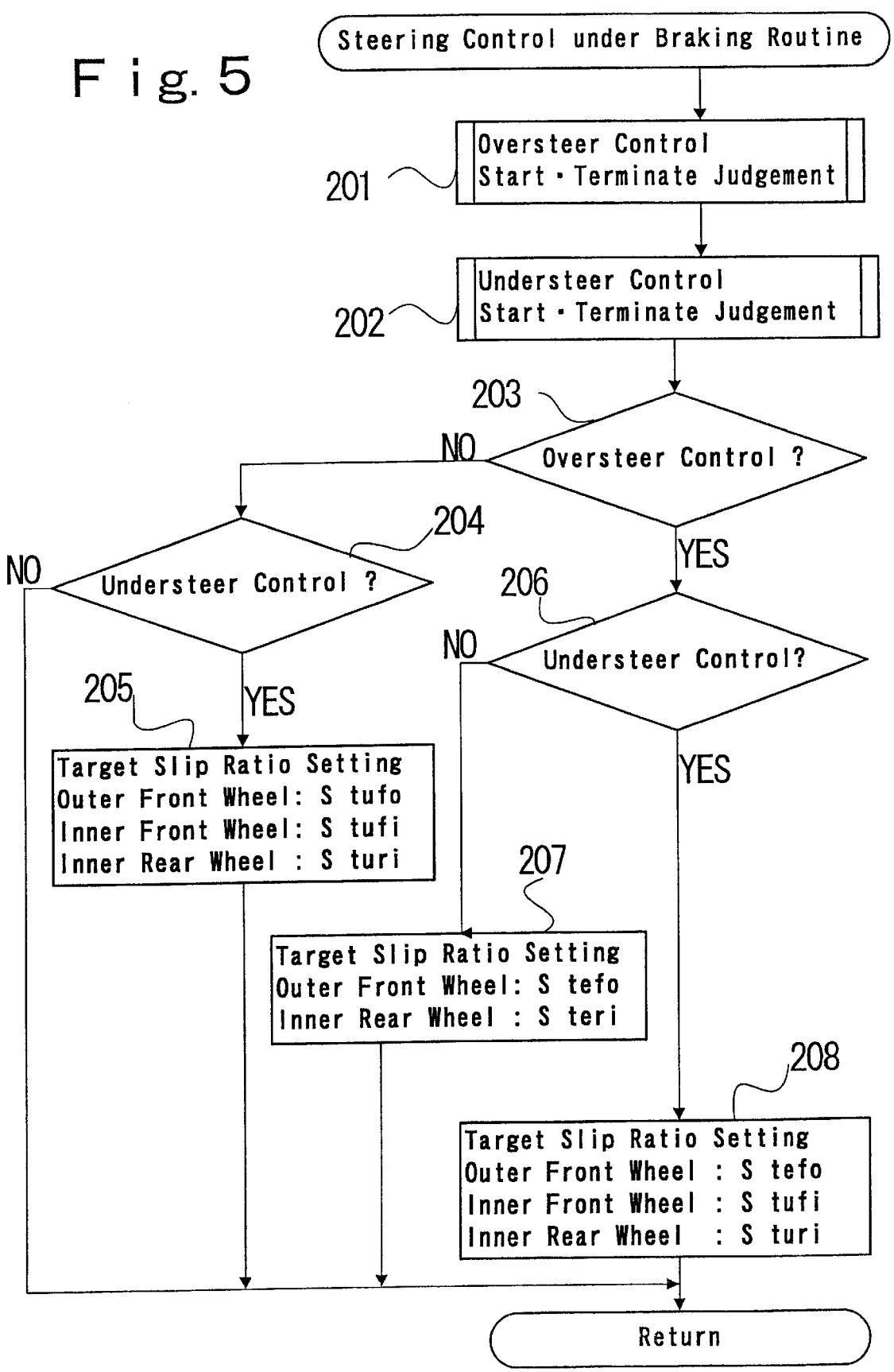

BRAKE CONTROL DEVICE FOR A VEHICLE

This application is based on and claims priority under 35 U.S.C. §119 with respect to Japanese Patent Application No. 2000-222892 filed on Jul. 24, 2000, the entire content of which is incorporated herein by reference.

FIELD OF THE INVENTION

This invention generally relates to a brake control device for a vehicle. More particularly, the present invention pertains to a vehicle brake control device having a hydraulic pressure generating device operable in response to operation of a brake pedal and operable independently of operation of the brake pedal. The present invention is applicable specifically for use in steering control by braking (vehicle slide slip preventing control) and traction control.

BACKGROUND OF THE INVENTION

A known brake control device for a vehicle is disclosed in published European Patent Application No. 0 379 329 A2 which corresponds to a Japanese Patent Application published as Toku-Kai-Hei 2(1990)-241863). This known brake control device includes a master cylinder for generating a hydraulic pressure to be supplied to wheel brake cylinders associated with road wheels of the vehicle, a booster for activating the master cylinder in response to operation of a brake pedal, an electro-magnetic valve device for activating the booster independently of the operation of the brake pedal, and a plurality of modulators interposed between the master cylinder and each of the wheel cylinders for regulating the hydraulic pressure to the corresponding wheel brake cylinder supplied from the master cylinder. When the driving road wheel is spinning, the booster is automatically activated by the electro-magnetic valve device to activate the master cylinder. Braking torque is applied to a controlled road wheel which is spinning, independently of a brake pedal operation, so that traction control is executed. While the traction control is being executed, the non-controlled road wheel, which is not driven, is disconnected from the master cylinder.

According to this known brake control device, the non-controlled road wheel is always disconnected from the master cylinder while the traction control is being executed. When the brake pedal is depressed by a driver when the traction control is being executed, a vehicle deceleration corresponding to the brake pedal depression is not able to be generated. Further, when this known brake control device is applied for use in other automatic brake control devices including steering control by braking, the same drawback occur.

Thus, this known vehicle brake control device is susceptible of certain improvements with respect to generating vehicle deceleration corresponding to the brake pedal depression when the brake pedal is depressed while the automatic brake control is being applied to the controlled road wheel.

Accordingly, a need exists for an improved brake control device which generates vehicle deceleration corresponding to brake pedal depression when the brake pedal is depressed while the automatic brake control is being performed. A need also exists for a an improved brake control device that is able to achieve sufficient brake pedal operation when the brake operation is performed by the driver.

SUMMARY OF THE INVENTION

According to an aspect of the present invention, a brake control device for a vehicle includes a brake pedal, a brake pedal operational condition detecting device for detecting an operational condition of the brake pedal, first and second wheel brake cylinders responsive to supplied hydraulic pressure for applying brake torque to the first and second road wheels, respectively, and a hydraulic pressure generating device for generating hydraulic pressure in response to operation of the brake pedal and for generating hydraulic pressure independently of the operation of the brake pedal. The hydraulic pressure generating device is hydraulically connected to the first and second wheel cylinders. A hydraulic pressure control valve device is disposed between the hydraulic pressure generating device and the first wheel brake cylinder for regulating hydraulic pressure in the first wheel cylinder supplied from the hydraulic pressure generating device, and is disposed between the hydraulic pressure generating device and the second wheel brake cylinder for regulating hydraulic pressure in the second wheel brake cylinder supplied from the hydraulic pressure generating device independently of regulation for hydraulic pressure in the first wheel brake cylinder. A first control device responsive to vehicle motion under the non-operated condition of the brake pedal is provided for activating the hydraulic pressure generating device, and for activating the hydraulic pressure control valve device to supply hydraulic pressure to one of the first and second wheel brake cylinders corresponding to one of the first and second road wheels to be controlled in response to the vehicle motion and to regulate hydraulic pressure in the one wheel brake cylinder, and to inhibit supplying hydraulic pressure to the other of the first and second wheel brake cylinders corresponding to the other of the first and second road wheels to be not controlled in response to the vehicle motion. In addition, a second control device responsive to the brake pedal operational condition detected by the brake pedal operational condition detecting device under the activated condition of the hydraulic pressure control valve device by the first control means controls the operation of the hydraulic pressure control valve device to supply hydraulic pressure to the other wheel brake cylinder without obstructing hydraulic pressure regulating performance of the first control means with respect to the one wheel brake cylinder.

Therefore, when the brake pedal is operated under the automatic brake control by the first control means, a proper response to the brake pedal operation is generated.

The brake control device for the vehicle further includes a vehicle deceleration detecting device for detecting or estimating vehicle deceleration. The second control device includes a target vehicle deceleration calculating mechanism for calculating the target vehicle deceleration on the basis of the brake pedal operational condition detected by the brake pedal operational condition detecting device, a vehicle deceleration comparing mechanism for comparing the target vehicle deceleration calculated by the target vehicle deceleration calculating mechanism with the vehicle deceleration detected or estimated by the vehicle deceleration detecting mechanism, and a valve control device responsive to an output by the vehicle deceleration comparing mechanism for controlling the pressure control valve device so that the vehicle deceleration resembles the target vehicle deceleration by regulating the brake pressure in the other wheel brake cylinders. The brake pedal operational condition detecting device includes a stroke sensor for detecting the operational stroke of the brake pedal. The valve control device controls the operation of the hydraulic pressure control valve device so as to increase hydraulic pressure in the other wheel brake cylinder when the vehicle deceleration becomes equal to the target vehicle deceleration.

Therefore, when the automatic brake control is performed when the brake pedal is being operated, vehicle deceleration corresponding to the brake pedal operation is generated. The wheel brake cylinders associated with all the road wheels are prevented from being cut off from the master cylinder and a sufficient brake pedal operation is thus achieved when the brake operation is performed by the driver.

It is preferable that the first control device performs a steering control by braking or a traction control. The steering control by braking is performed for activating the hydraulic pressure control valve device to supply the brake pressure to the one wheel cylinder in accordance with the vehicle motion under the oversteer restraining control or understeer restraining control when the brake pedal is under the non-controlled operation and for applying braking force to a vehicle portion at which the one road wheel is mounted on the vehicle. The traction control is performed for activating the hydraulic pressure control valve device to apply the brake torque to the driving road wheel in response to an acceleration slip ratio of the driving road wheel under the brake pedal being non-operated while the vehicle is being accelerated.

The hydraulic pressure control valve device preferably includes a first hydraulic pressure control valve disposed between the hydraulic pressure generating device and the first wheel brake cylinder, and a second hydraulic pressure control valve operable independently of operation of the first pressure control valve disposed between the hydraulic pressure generating device and the second wheel brake cylinder.

In addition, the hydraulic pressure generating device preferably includes a reservoir containing brake fluid, a master cylinder for generating a hydraulic pressure by increasing pressure of the brake fluid, a fluid pressure booster for activating the master cylinder in response to the operation of the brake pedal, a booster driving device for activating the fluid pressure booster independently of the operation of the brake pedal, and a brake pedal remaining mechanism for maintaining the brake pedal at an initial position thereof while the fluid pressure booster is being activated by the booster driving device.

The fluid pressure booster is preferably a vacuum booster having a movable wall operatively connected to the master cylinder, a constant pressure chamber defined at a front side of the movable wall and communicated with a vacuum source, a variable pressure chamber defined at a rear side of the movable wall, and a valve mechanism carried by the movable wall and operatively connected to the brake pedal for controlling communication between the constant pressure chamber and the variable pressure chamber and communication between the variable pressure chamber and the atmosphere in response to the brake pedal operation. The booster driving device includes a solenoid carried by the movable wall and operatively connected to the valve mechanism. The brake pedal remaining mechanism includes a first input member operatively connected to the brake pedal and movable in accordance with the brake pedal operation, and a second input member operatively connect to the valve mechanism, with the second member being movable forward with the first input member as a unit to operate the valve mechanism when the brake pedal is operated and being movable forward with the movable wall of the vacuum booster relative to the first input member when the vacuum booster is activated by the booster driving device under the non-operated condition of the brake pedal.

According to another aspect of the invention, a brake control device for a vehicle having first and second road wheels includes a brake pedal, a brake pedal sensor operatively connected to the brake pedal for detecting an operational condition of the brake pedal, a first wheel brake cylinder receiving hydraulic pressure to apply brake torque to the first road wheel, a second wheel brake cylinder receiving hydraulic pressure to apply brake torque to the second road wheel, and a hydraulic pressure generating device which generates both hydraulic pressure in response to operation of the brake pedal and hydraulic pressure independently of operation of the brake pedal, with the hydraulic pressure generating device being hydraulically connected to the first and second wheel cylinders. A first hydraulic pressure control valve is disposed between the hydraulic pressure generating device and the first wheel brake cylinder for regulating hydraulic pressure in the first wheel cylinder supplied from the hydraulic pressure generating device, and a second hydraulic pressure control valve is disposed between the hydraulic pressure generating device and the second wheel brake cylinder for regulating hydraulic pressure in the second wheel brake cylinder supplied from the hydraulic pressure generating device independently of regulation of hydraulic pressure in the first wheel brake cylinder. A first control device is responsive to vehicle motion under a non-operated condition of the brake pedal for activating the hydraulic pressure generating device and activating the first hydraulic pressure control valve device to supply hydraulic pressure to the first wheel brake cylinder of the first road wheel to be controlled in response to the vehicle motion and to regulate hydraulic pressure in the first wheel brake cylinder, while also inhibiting supply of hydraulic pressure to the second wheel brake cylinder corresponding to the second road wheel which is not to be controlled in response to vehicle motion. A vehicle deceleration detecting mechanism detects or estimates vehicle deceleration, a target vehicle deceleration calculating mechanism calculates a target vehicle deceleration based on the brake pedal operational condition detected by the brake pedal sensor, and a vehicle deceleration comparing mechanism compares the target vehicle deceleration calculated by the target vehicle deceleration calculating mechanism with the detected or estimated vehicle deceleration provided by the vehicle deceleration detecting mechanism. A valve control is responsive to an output by the vehicle deceleration comparing mechanism for controlling operation of the second hydraulic pressure control valve device to cause the detected or estimated vehicle deceleration to equal the target vehicle deceleration by regulating hydraulic pressure in the second wheel brake cylinder without obstructing hydraulic pressure regulating performance of the first control device with respect to the first wheel brake cylinder.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 5 is a flowchart showing the routine for steering control by braking forming a part of the main routine shown in FIG. 4;

DETAILED DESCRIPTION OF THE INVENTION

Figure 1:
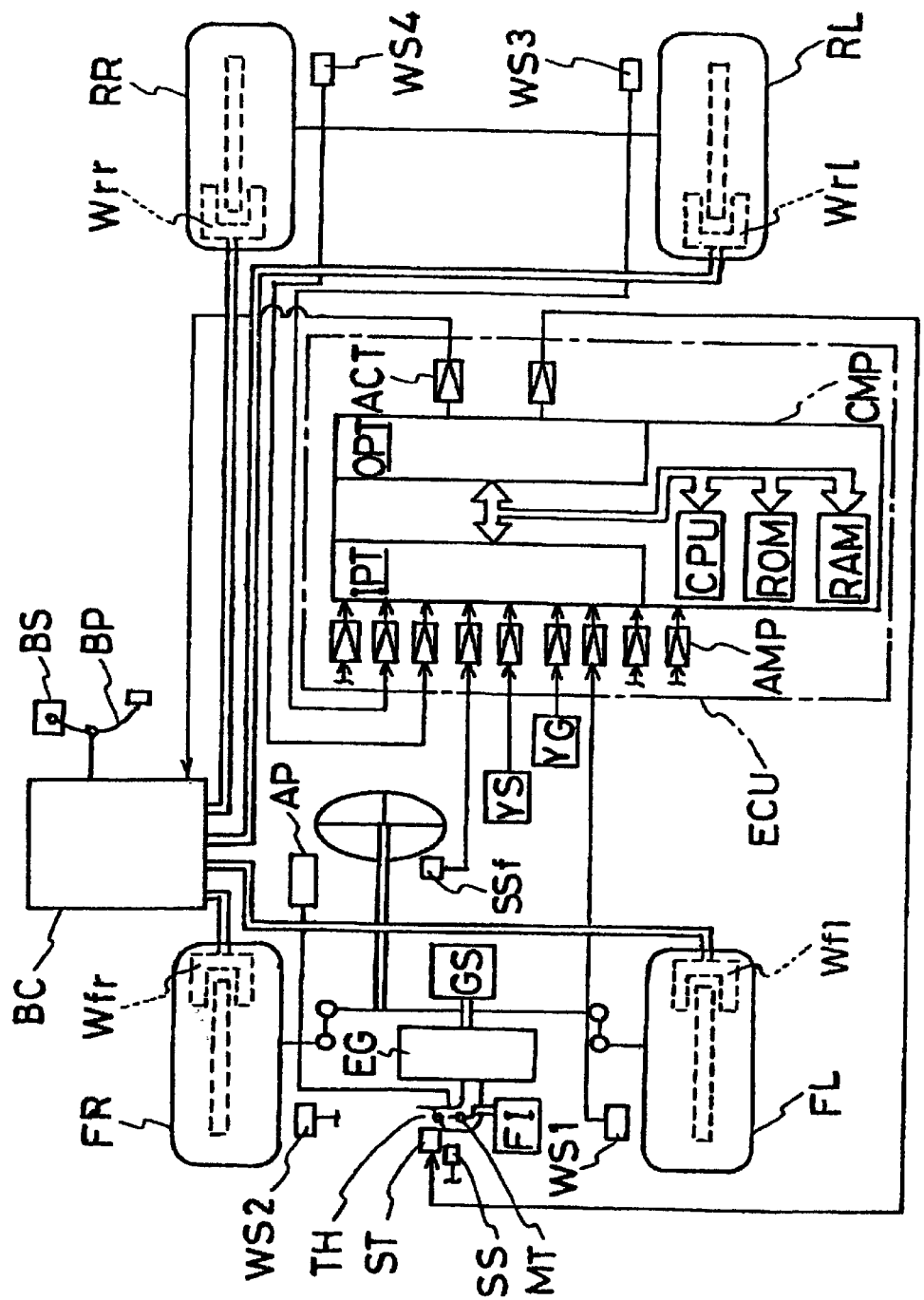
FIG. 1 is a schematic illustration of a brake control device for a vehicle according to an embodiment of the present invention.

Referring initially to FIG. 1, which schematically illustrates the overall vehicle brake control device according to the present invention, an engine EG (in this embodiment, an internal combustion engine) is provided with a throttle control apparatus TH and a fuel injection apparatus FI. The throttle control apparatus TH has a main throttle valve MT which is activated in response to operation of an accelerator pedal AP and serves to control the opening degree of the main throttle. The throttle control apparatus TH also has a sub-throttle valve ST which is activated in response to the output of an electronic control unit ECU and serves to control a sub-throttle opening degree. The fuel injection apparatus FI is actuated in response to the output of the electronic control unit ECU and serves to control the amount of fuel injected into the engine EG. The engine EG is operatively connected with front wheels FL, FR through a transmission GS and a known front differential gear, and is activated by a so-called front-wheel-drive system.

A wheel brake cylinder Wfl, Wfr, Wrl, Wrr is mounted on each of the front wheels FL, FR and each of the rear wheels RL, RR, respectively. A brake pressure control apparatus BC is connected to each of the wheel brake cylinders through hydraulic conduits. The wheel FL designates the driving wheel at the front left side as viewed from the position of a driver's seat, the wheel FR designates the driving wheel at the front right side as viewed from the position of a driver's seat, the wheel RL designates the driven wheel at the rear left side as viewed from the position of a driver's seat, and the wheel RR designates the driven wheel at the rear right side as viewed from the position of a driver's seat. The brake pressure control apparatus BC is schematically illustrated in FIG. 2 and will be explained in more detail later.

Figure 2:
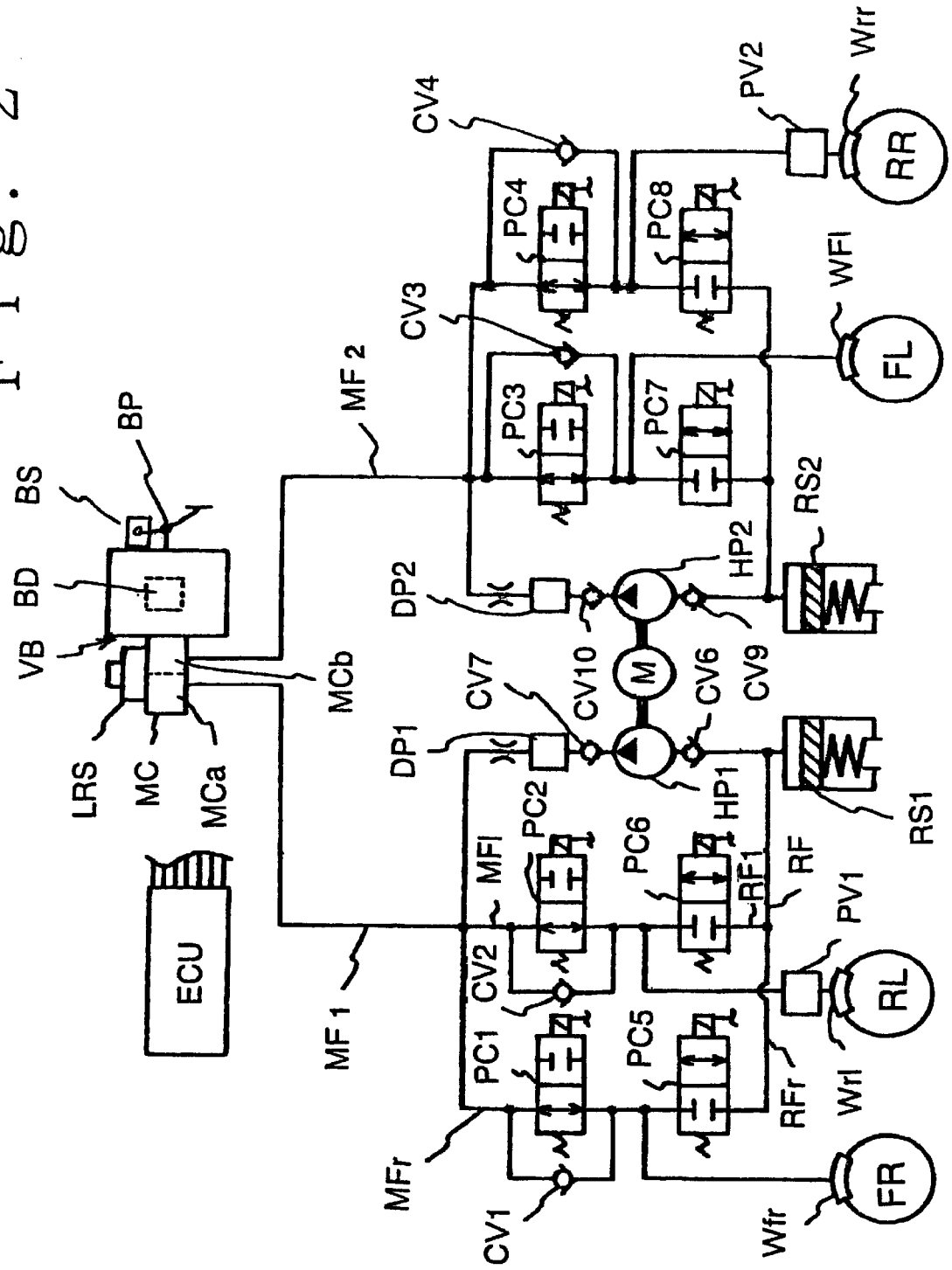
FIG. 2 is a schematic view of the brake pressure control apparatus used in the brake control device shown in FIG. 1.

As shown in FIG. 2, the wheels FL, FR, RL, RR are provided with respective wheel speed sensors WS1, WS2, WS3, WS4. The wheel speed sensors WS1, WS2, WS3, WS4 are connected to the electronic control unit ECU and output signals in the form of pulses proportional to the rotational speed of the respective wheels so that wheel speed signals indicative of the speed of each wheel are fed to the electronic control unit ECU. Further, other sensors are connected to the electronic control unit ECU, including a brake switch BS for detecting a stroke of a brake pedal BP, a front steering angle sensor SSf for detecting a steering angle θf of each front wheel FL, FR, a lateral acceleration sensor YG for detecting a vehicle lateral acceleration Gy, a yaw rate sensor YS for detecting a vehicle yaw rate γ, and a throttle position sensor SS for detecting the opening degree of the main throttle valve MT and the sub-throttle valve ST.

The yaw rate sensor YS acts to detect the varying rate of the vehicle rotational angle (a yaw angle) around a vertical axis on the vehicle center of gravity. That is, the yaw angular velocity (the yaw rate) is detected by the yaw rate sensor YS and is outputted to the electronic control unit ECU as an actual yaw rate γ.

As an alternative to the above structure, a steering angle control apparatus may be provided between the rear wheels RL, RR. The steering angle of the rear wheels RL, RR can be respectively controlled by the steering angle control apparatus which is actuated by an electric motor in response to the output from the electronic control unit ECU.

The electronic control ECU is provided with a microcomputer CMP which includes a central processing unit CPU, a read-only memory ROM, a random access memory RAM, an input port IPT, and an output port OPT, all which are operatively controlled with one another through a bus as shown in FIG. 1. The output signals from the wheel speed sensors WS1, WS2, WS3, WS4, the brake switch BS, the front steering angle sensor SSf, the yaw rate sensor YS, the lateral acceleration sensor YG, and the throttle position sensor SS are transmitted to the input port IPT via respective amplification circuits AMP and then to the central processing unit CPU. The output signals are controlled by the electronic control unit ECU and transmitted as control signals from the output port OPT via respective driving circuits ACT to the throttle control apparatus TH and then to the brake pressure control apparatus BC. The read-only memory ROM included in the microcomputer CMP memorizes a program corresponding to various processes including, for example, a process shown by the flowchart illustrated in FIG. 4. The central processing unit CPU executes the program when the ignition switch is in a closed condition. The random access memory RAM temporarily memorizes variable data required to execute the program.

As an alternative to the arrangement described above, a plurality of microcomputers CMP can be provided corresponding to respective controls such as the throttle control or corresponding to controls relevant to each other. In this case, the microcomputers CMP can be electrically connected to each other.

FIG. 2 is a schematic illustration of the brake pressure control apparatus BC according to the present invention. A master cylinder MC is assisted and activated by a vacuum booster VB, the details of which will be described later, in response to depression of the brake pedal BP. The hydraulic brake pressure in a master reservoir LRS is pressurized and is outputted to hydraulic circuits for the respective wheels FR, RL, FL, RR. That is, a so-called diagonal hydraulic circuit system is employed. The master cylinder MC is a tandem type master cylinder having two pressure chambers communicating with the hydraulic circuits, respectively. A first pressure chamber MCa of the master cylinder MC communicates with the hydraulic circuits for the front right wheel FR and the rear left wheel RL, and a second pressure chamber MCb of the master cylinder MC communicates with the hydraulic circuits for the front left wheel FL and the rear right wheel RR.

With respect to the hydraulic circuits for the front right wheel FR and the rear left wheel RL, the first pressure chamber MCa is connected to the wheel brake cylinders Wfr, Wrl via a main passage MF1 and its branch passages MFr, MF1.

A normally open type two-port two-position electro-magnetic valve PC1 (hereinafter, simply referred to as the electro-magnetic valve PC1) is disposed in the branch passage MFr, and a check valve CV1 is disposed in parallel to the electro-magnetic valve PC1. A normally open type two-port two-position electro-magnetic valve PC2 (hereinafter, simply referred to as the electro-magnetic valve PC2) is disposed in the branch passage MF1, and a check valve CV2 is disposed in parallel to the electro-magnetic valve PC2. The check valves CV1, CV2 allow brake fluid to flow in a direction of the master cylinder MC while preventing reverse flow. The brake fluid in the wheel brake cylinders Wfr, Wrl is returned to the master cylinder MC via the check valves CV1, CV2 and the electro-magnetic valves PC1, PC2 and then to the master reservoir LRS. Therefore, when the brake pedal BP is released, hydraulic pressure in the wheel brake cylinders Wfr, Wrl rapidly decreases corresponding to a decrease of the hydraulic pressure in the master cylinder MC.

Normally closed type two-port two-position electro-magnetic valves PC5, PC6 (hereinafter, simply referred to as the electro-magnetic valves PC5, PC6) are disposed in respective branch passages Rfr, Rfl for discharging the pressurized brake fluid in the wheel brake cylinders Wfr, Wrl, respectively. The branch passages Rfr, Rfl merge into a drain passage RF which is connected to an auxiliary reservoir RS1. An inlet side of a hydraulic pressure pump HP1 is connected to the auxiliary reservoir RS1 through a check valve CV6. An outlet side of the hydraulic pressure pump HP1 is connected to an upstream side of the electro-magnetic valves PC1, PC2 through a check valve CV7. The hydraulic pressure pump HP1, and a hydraulic pressure pump HP2 disposed in the other hydraulic circuit, are driven by a single electric motor M to return the brake fluid from the auxiliary reservoir RS1 to the outlet side.

The auxiliary reservoir RS1 is disposed independently of the master reservoir LRS of the master cylinder MC and is provided with a piston and a spring. Therefore, the auxiliary reservoir RS1 acts as an accumulator for storing a predetermined amount of brake fluid. The check valves C6, C7 serve to restrict the flow of the brake fluid discharged from the hydraulic pressure pump HP1 in a predetermined direction and are normally formed in the hydraulic pressure pump HP1 as a unit.

A damper DP1 is disposed at the outlet side of the hydraulic pressure pump HP1. In addition, a proportioning valve PV1 is disposed in the hydraulic circuit connected to the wheel brake cylinder Wrl for the rear wheel RL.

In a manner similar to that described above, the hydraulic circuits for the front left wheel FL and the rear right wheel RR are provided with normally open type two-port two-position electro-magnetic valves PC3, PC4, normally closed type two-port two-position electro-magnetic valves PC7, PC8, check valves CV3, CV4, CV9, CV10, an auxiliary reservoir RS2, a damper DP2 and a proportioning valve PV2. The hydraulic pressure pump HP2 is driven by the same electric motor M that drives the hydraulic pressure pump HP1. Each electro-magnetic valve PC1–PC8 acts as a hydraulic pressure control valve for controlling the brake hydraulic pressure in each wheel brake cylinder Wfr, Wrl, Wfl, Wrr.

Figure 3:
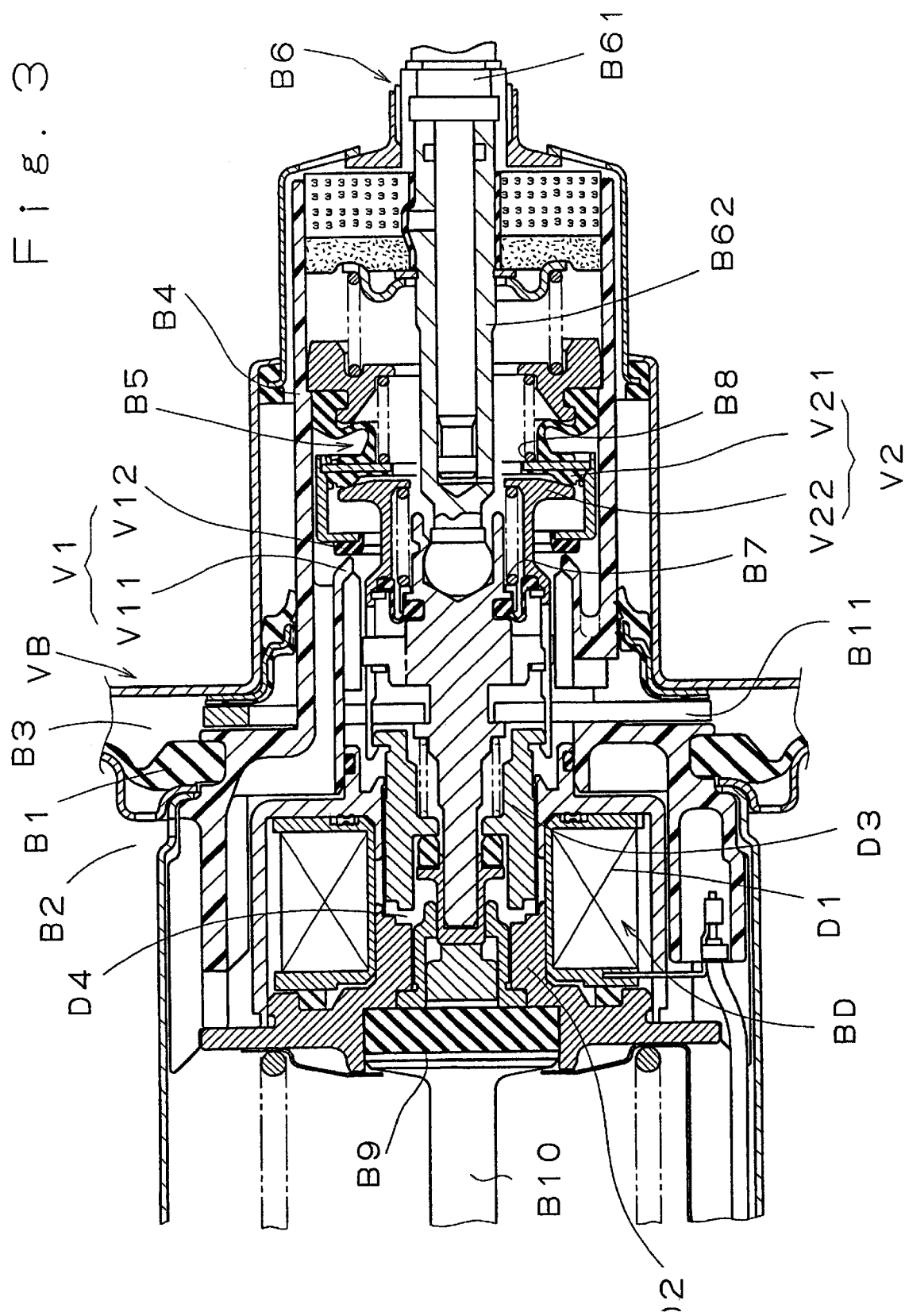
FIG. 3 is a cross-sectional view of a vacuum booster and a booster driving device shown in FIG. 2.

FIG. 3 shows the structure of the vacuum booster VB and the booster driving device BD. The booster driving device BD is accommodated in the vacuum booster VB and drives the vacuum booster VB automatically at least when the brake pedal BP is under a non-operated condition.

The vacuum booster VB according to the present invention is formed in a manner similar to a known vacuum booster. A constant pressure chamber B2 and a variable pressure chamber B3 are formed inside a housing by a movable wall B1. The movable wall B1 is connected to a power piston B4 as a unit. The constant pressure chamber B2 is always connected to a negative pressure source such as the intake manifold of the engine EG so that a negative pressure is introduced into the constant pressure chamber B2. The power piston B4 is operatively connected to an output rod B10 via a reaction disk B9 to execute a force transmitting operation. The output rod B10 is connected to the master cylinder MC.

A vacuum valve V1 and an air valve V2 are disposed in the power piston B4 and act as a valve mechanism B5. The vacuum valve V1 is provided with an annular valve seat V11 formed with the power piston B4 and an elastic valve member V12 which is engageable with and disengageable from the annular valve seat V11. The vacuum valve V1 interrupts communication between the constant pressure chamber B2 and the variable pressure chamber B3. The air valve V2 is provided with an elastic valve seat V21 integrally connected to the valve member V12 and a valve member V22 which is engageable with and disengageable from the elastic valve seat V21. The air valve V2 interrupts communication between the variable pressure chamber B3 and the atmosphere. The valve member V22 is operatively connected to an input rod B6 which is operatively associated with the brake pedal BP. A spring B7 exerts an actuating force on the valve member V22 to bias the valve member V22 in a direction to be in contact with the elastic valve seat V21. A spring B8 exerts an actuating force to move the elastic valve member V12 in a direction to contact the annular valve seat V11 and to move the elastic valve seat V21 in the direction to contact the valve member V22.

Accordingly, the vacuum valve V1 and the air valve V2 are operated for opening and closing movement in response to depression of the brake pedal BP. A pressure differential is produced between the constant pressure chamber B2 and the variable pressure chamber B3 corresponding to the depressing force of the brake pedal BP. Therefore, an output force pressurized corresponding to the depression of the brake pedal BP is transmitted to the master cylinder MC.

The booster driving device BD includes a solenoid D1, a fixed core D2 and a movable core D3. The solenoid D1 is electrically connected to the electronic control unit ECU shown in FIG. 2 and serves to attract the movable core D3 towards the fixed core D2 when the solenoid D1 is excited or energized. The fixed core D2 is disposed between the power piston B4 and the reaction disk B9 so that a force transmission is executed from the power piston B4 to the reaction disk B9. The movable core D3 is disposed in the solenoid D1 and faces the fixed core D2 with a magnetic gap D4 defined between the movable core D3 and the fixed core D2. The movable core D3 is operatively connected to the valve member V22 forming the air valve V2. When the movable core D3 is moved towards the fixed core D2 to decrease the amount of the magnetic gap D4, the valve member V22 is moved in the same direction as a unit.

The input rod B6 includes a first input rod B61 and a second input rod B62. The first input rod B61 is integrally connected to the brake pedal BP. The second input rod B62 is relatively movable against the first input rod B61 and acts as a force transmitting member towards the output rod B10 via a key member B11 corresponding to movement of the power piston B4. Therefore, the input rods B61, B62 act as a so-called brake pedal remaining mechanism for keeping the brake pedal initial position while the vacuum booster VB is being activated.

Set forth below is a description of the operation of the booster driving device BD, the vacuum booster VB and the brake pedal remaining mechanism when the automatic brake control modes (such as steering control by braking and traction control) are executed and wheel brake cylinders for the controlled wheels are pressurized at least when the brake pedal is in the non-operated condition.

When the automatic brake control is executed by the electronic control unit ECU, the solenoid D1 first becomes excited or energized and the movable core D3 is moved to reduce the magnetic gap D4. The valve member V22 forming the air valve V2 is moved in the same direction with the movable core D3 so that the two move as a unit against the rearward actuating force of the spring B7. As a result, the elastic valve member V12 forming the vacuum valve V1 is moved in a vehicle forward direction (i.e., to the left in FIG. 3) by virtue of the forward actuating force of the spring B8 and comes in contact with the annular valve seat V11. Therefore, communication between the variable pressure chamber B3 and the constant pressure chamber B2 is interrupted. The valve member V22 forming the air valve V2 is further moved in the vehicle forward direction and becomes separated from the elastic valve seat V21. Therefore, atmospheric air is fed into the variable pressure chamber B3. The pressure differential between the variable pressure chamber B3 and the constant pressure chamber B2 is thus generated. Accordingly, corresponding to the movements of the power piston B4, the fixed core D2, the reaction disk B9 and the output rod B10 towards the master cylinder MC, the master cylinder MC is automatically actuated to discharge a hydraulic pressure.

Upon the power piston B4 being operatively connected to the key member B11, the second input rod B62 engaged with the key member B11 is moved forwards with the power piston B4 integrally. In the meantime, the first input rod B61 is maintained at an initial position because the forward moving force of the power piston B4 is not transmitted to the first input rod B61. That is, the brake pedal BP is maintained at the initial position when the vacuum booster VB is automatically actuated by the booster driving device BD.

As described above, a hydraulic pressure generating device of the present invention is configured with the vacuum booster VB, the booster driving device BD, and the master cylinder MC.

The steering controls by braking (oversteer restraining control and understeer restraining control) are executed with the booster driving device BD, the electro-magnetic valves PC1–PC8, and the electric motor M which are electrically controlled by the electronic control unit ECU. Performance of a braking control process in accordance with the routine shown in the FIG. 4 flowchart is executed at intervals of 6 ms when an ignition switch is set in a closed position.

Figure 4:
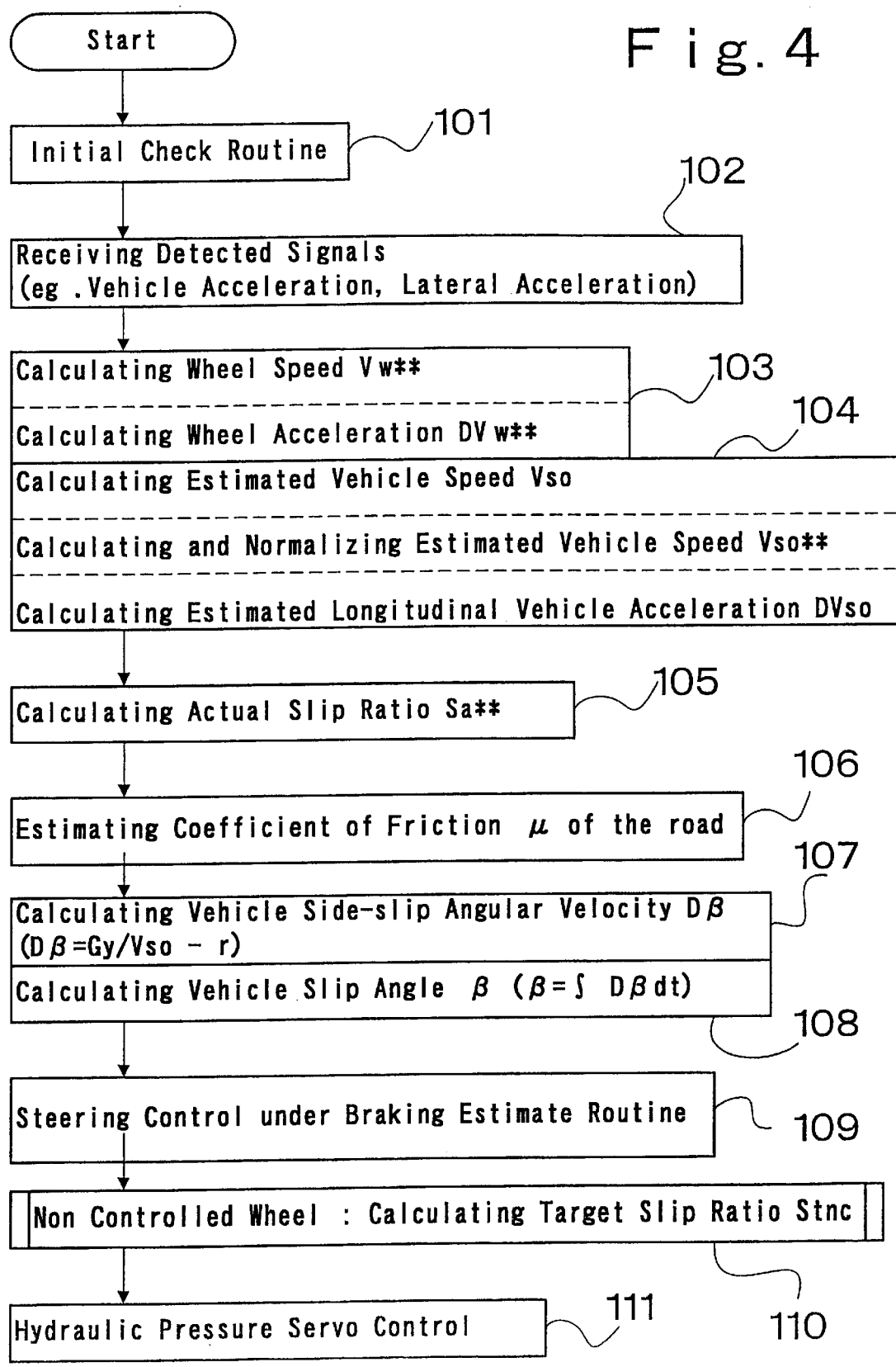
FIG. 4 is a flowchart of the main routine for carrying out steering control by braking according to the present invention.

Referring to FIG. 4, the program or routine begins with initialization of the microcomputer CMP at step 101 to clear various operational values. At step 102, the microcomputer CMP receives various detection signal inputs, including detection signals from the wheel speed sensors WS1, WS2, WS3, WS4, a detection signal (the steering angle θf) from the front steering angle sensor SSF, a detection signal (the actual yaw rate γ) from the yaw rate sensor YS, a detection signal (the actual lateral acceleration Gya) from the lateral acceleration sensor YG, and a detection signal (the stroke of the brake pedal BP) from the brake switch BS.

Next, the program proceeds to step 103, where the wheel speed Vw ( represents one of the wheels FL, FR, RL, RR) of each wheel is calculated and differentiated to provide the wheel acceleration DVw at each wheel. Noise generated by the wheel acceleration DVw is eliminated by a filter to provide a formal wheel acceleration FDVw. Next, at step 104, an estimated vehicle speed Vso is calculated at the vehicle center of gravity on the basis of each calculated wheel speed Vw. Hereinafter, the estimated vehicle speed Vso at the vehicle center of gravity is referred to as a first estimated vehicle speed Vso. More specifically, when the vehicle is being accelerated or the vehicle is being driven at a constant speed, the first estimated vehicle speed Vso is calculated in accordance with the following equation:

$$V_{SO} = \text{MIN}(V_W^{**}).$$

On the other hand, when the brake pedal BP is being depressed, the first estimated vehicle speed Vso is calculated in accordance with the following equation:

$$V_{SO} = \text{MAX}(V_W^{**}).$$

Next, the program proceeds to calculate an estimated vehicle speed Vso at a position for each wheel FR, FL, RR, RL. Hereinafter, the estimated vehicle speed Vso at the position for each wheel is referred to as a second estimated vehicle speed Vso. Further, if necessary, the second vehicle speed Vso may be normalized to reduce errors caused by a difference between the wheels located on the inside and outside of the curve while the body (vehicle) is turning. That is, a normalized vehicle speed NVso** is calculated in accordance with the following equation:

$$NV_{SO}^{} = V_{SO}^{}(n) - \Delta V_r^{**}(n).$$

ΔVr(n) is designated as a correction factor provided for correction during vehicle body turning. That is, the correction factor ΔVr(n) is set on the basis of a turning radius R and γ·VsoFW which is nearly equal to the lateral acceleration Gya. Once again, the designation  represents one of the wheels FL, FR, RL, RR, while FW represents the front wheels and RW represents the rear wheels. The correction factor ΔVr(n) is set according to a map provided for each wheel except for a reference wheel. If ΔVrFL is employed as the reference wheel, for example, it is set to be zero. ΔVrFR is set according to the map provided for the difference between two wheels located on the inside and outside of the curve during vehicle body turning. ΔVrRL is set according to the map provided for the difference between two wheels both located on the inside of the curve during the vehicle body turning. ΔVrRR is set according to the map provided for the difference between two wheels both located on the outside of the curve during the vehicle body turning and also according to the map provided for the difference between two wheels located on the inside and the outside of the curve during the vehicle body turning. Furthermore, the first estimated vehicle speed Vso is differentiated to provide an estimated longitudinal vehicle acceleration Dvso at the vehicle center of gravity. Hereinafter, the estimated longitudinal vehicle acceleration Dvso at the vehicle center of gravity is referred to as an estimated vehicle acceleration Dvso.

The program further proceeds to step 105, where an actual slip ratio Sa for each wheel is calculated on the basis of the wheel speed Vw and the second estimated vehicle speed Vso** in accordance with the following equation:

$$Sa^{} = (V_{SO}^{} - V_W^{})/V_{SO}^{}.$$

Next, at step 106, a coefficient of friction μ of a road surface for each wheel is calculated on the basis of the estimated vehicle acceleration Dvso and the actual lateral acceleration Gya determined by the detection signal from the lateral acceleration sensor YG in accordance with the following equation:

$$\mu \approx (DVso^2 + Gya^2)^{1/2}.$$

A coefficient of friction $\mu^{}$ of the road surface detected at the position of each wheel can be calculated on the basis of the coefficient of friction $\mu$ of the road surface and an estimated value of each wheel brake cylinder hydraulic pressure Pw. At step 107, a vehicle side-slip angular velocity D$\beta$ is calculated on the basis of the detection signal (the actual yaw rate $\gamma$) from the yaw rate sensor YS, the detection signal (the actual lateral acceleration Gya) from the lateral acceleration sensor YG and the first estimated vehicle speed Vso in accordance with the following equation:

$$D\beta = Gya/Vso - \gamma.$$

At step 108, a vehicle side-slip angle $\beta$ is calculated in accordance with the following equation:

$$\beta = \int D\beta dt$$

The vehicle side-slip angle $\beta$ corresponds to a vehicle body slip angle relative to the vehicle driving direction. The vehicle side-slip angular velocity D$\beta$ is a differentiated value d$\beta$/dt of the vehicle side-slip angle $\beta$. Alternatively, the vehicle side-slip angle $\beta$ can be calculated on the basis of a longitudinal vehicle speed Vx and a lateral vehicle speed Vy which is vertical to the longitudinal vehicle speed Vx, in accordance with the following equation:

$$\beta = \tan^{-1}(Vy/Vx)$$

Then, the program proceeds to step 109 where an operation for the steering control by braking is performed to determine a target slip ratio, which is described in more detail below, for use in a wheel for the steering control by braking. At step 110, a target slip ratio Stnc is calculated for use in a wheel which is not operated by the steering control by braking. The program proceeds to a final step 111 where a hydraulic pressure servo control, described in more detail below, is performed and the brake pressure control apparatus BC is controlled in response to the condition of the vehicle in motion. Thereafter, the program returns to step 102.

The operation of the steering control under braking at step 109 of the flowchart depicted in FIG. 4 is described below with reference to the flowchart shown in FIG. 5. The steering control under braking includes the oversteer (OS) restraining control and the understeer (US) restraining control. Through this flowchart in FIG. 5, the target slip ratio is set in accordance with the oversteer restraining control and/or the understeer restraining control.

At the outset, the program determines at step 201 whether the oversteer restraining control is to be started or terminated and determines at step 202 whether the understeer restraining control is to be started or terminated.

Figure 8:
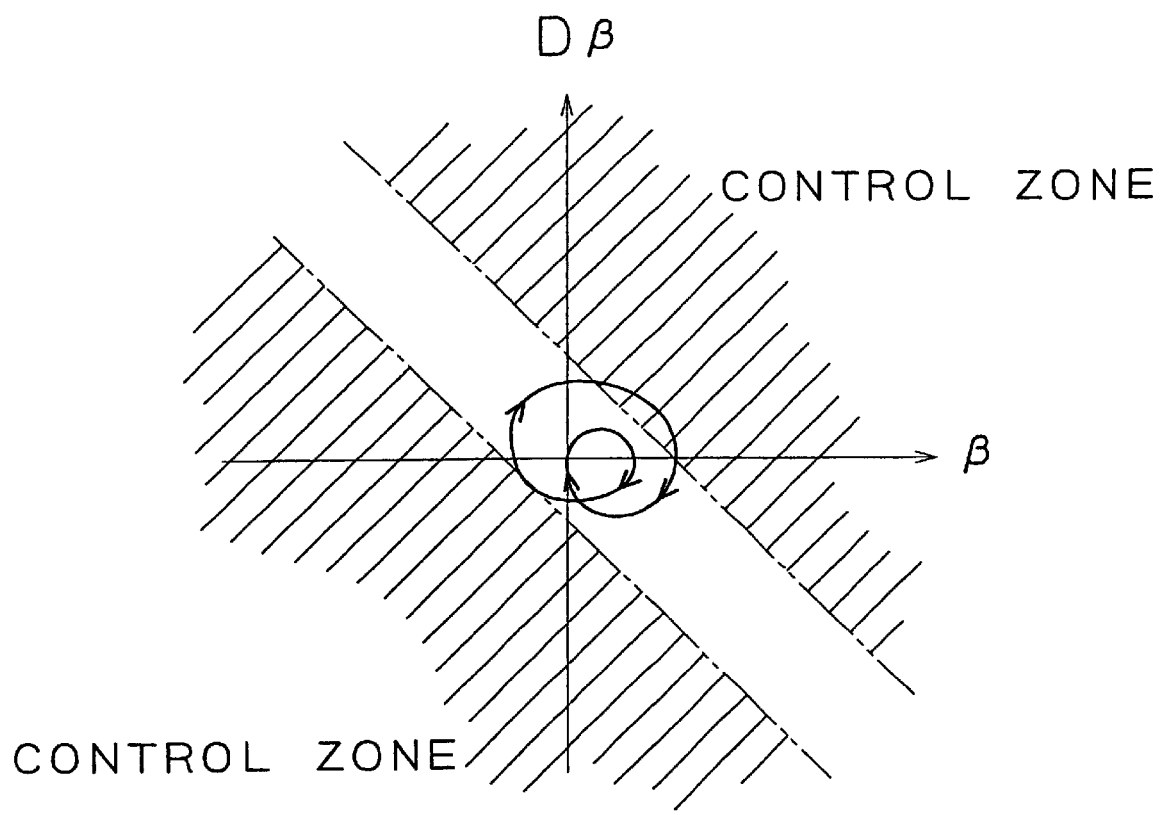
FIG. 8 is a graph showing the control zone of oversteer restraining control according to the present invention.

The determination at step 201 is performed on the basis of the determination whether the oversteer restraining control is within a control zone indicated by hatching as shown in FIG. 8. That is, if the vehicle side-slip angle $\beta$ and the vehicle side-slip angular velocity D$\beta$ are within the control zone when the start or termination of the oversteer restraining control is determined, the oversteer restraining control is started. If the vehicle side-slip angle $\beta$ and the vehicle side-slip angular velocity D$\beta$ goes out of the control zone, the oversteer restraining control is controlled as indicated by the arrow in FIG. 8 thereby to be terminated. The braking force applied to each wheel is controlled in such a manner that the further the vehicle side-slip angle $\beta$ and the vehicle side-slip angular velocity D$\beta$ remote from a boundary (as indicated by a double dashed line in FIG. 8) between the control zone and the non-control zone towards the control zone, the more the amount to be controlled will be increased.

Figure 9:
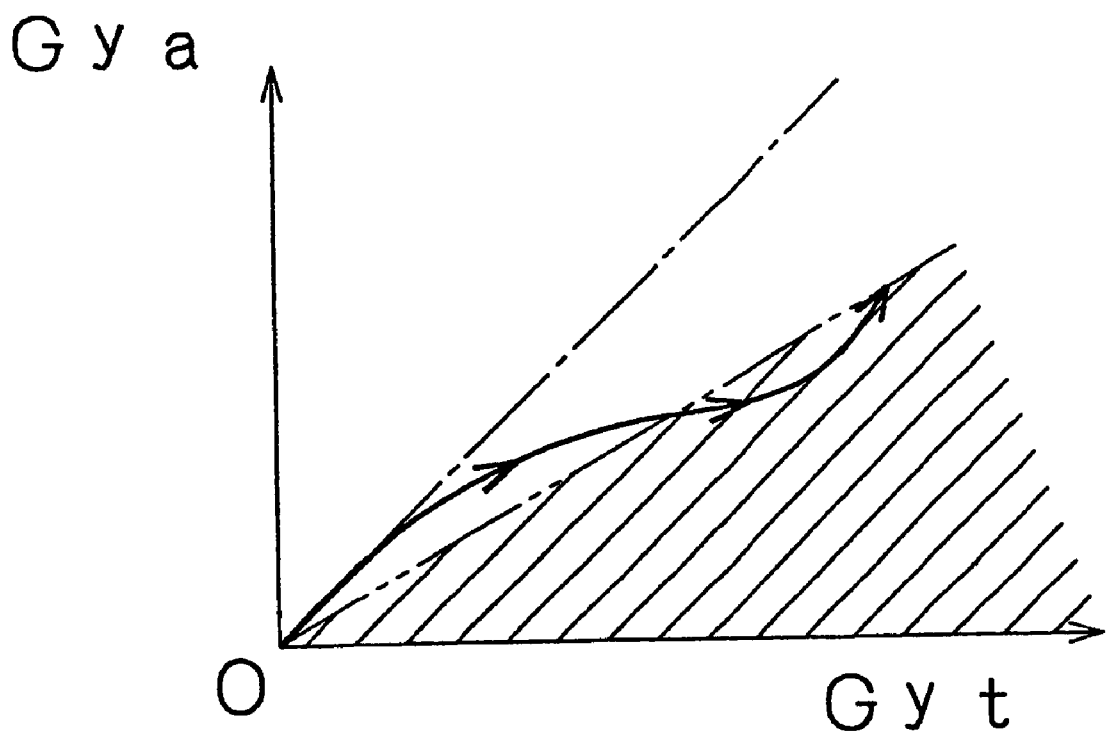
FIG. 9 is a graph showing the control zone of understeer restraining control according to the present invention.

The determination at the step 202 is performed on the basis of the determination whether the understeer restraining control is within a control zone indicated by hatching as shown in FIG. 9. That is, in accordance with a variation of the actual lateral acceleration Gya with respect to a target lateral acceleration Gyt, if they are remote from a desired condition indicated by the dashed line and moves into the control zone, the understeer restraining control is started. If they move out of the control zone, the understeer restraining control is controlled as indicated by the arrow in FIG. 9 to thereby be terminated.

Then, the program proceeds to step 203 to determine whether or not the oversteer restraining control is being performed. If the oversteer restraining control is not being performed, the program proceeds to step 204 to determine whether or not the understeer restraining control is being performed. If the understeer restraining control is not being performed either, the program returns to the main routine in FIG. 4. If the understeer restraining control is being performed, the program proceeds to step 205 where both front wheels and a rear wheel located on the inside of the curve are employed and the target slip ratio for each wheel is determined as "Sturi", "Stufo", and "Stufi" in accordance with the understeer restraining control. As for the target slip ratio, "t" indicates a target value which is comparable with a measured value indicated by "a" described later. "u" indicates the understeer restraining control, "f" indicates the front wheel, "r" indicates the rear wheel, "o" indicates the outside of the curve, and "i" indicates the inside of the curve.

The difference between the actual lateral acceleration Gya and the target lateral acceleration Gyt is employed to determine the target slip ratio. The target lateral acceleration Gyt is calculated in accordance with the following equation:

$$Gyt = \gamma(\theta f) \cdot Vso;$$

where $\gamma(\theta f)$ is calculated in accordance with the following equation:

$$\gamma(\theta f) = \{(\theta f/N) \cdot L\} \cdot Vso/(1 + Kh \cdot Vso2);$$

where "Kh" indicates a stability factor, "N" indicates a steering gear ratio, and "L" indicates the wheel base of the vehicle. The target slip ratio in accordance with the understeer restraining control is calculated on the basis of the lateral acceleration $\Delta$Gy which is the difference between the actual lateral acceleration Gya and the target lateral acceleration Gyt. That is, the target slip ratios "Stufo", "Stufi", and "Sturi" are calculated in accordance with the following equations respectively:

$$Stufo = K5 \cdot \Delta Gy;$$

$$Stufi = K6 \cdot \Delta Gy;$$

$$Sturi = K7 \cdot \Delta Gy;$$

where K5 is a constant for providing the target slip ratio "Stufo" which is used for increasing the braking pressure (or decreasing the braking pressure), while K6 is a constant for providing the target slip ratio "Stufi" and K7 is constant for providing the target slip ratio "Sturi", both of which are used for increasing the braking pressure.

On the other hand, if the oversteer restraining control is being performed at step 203, the program proceeds to step 206 to determine whether or not the understeer restraining control is being performed. If the understeer restraining control is not being performed, the program proceeds to step 207. At step 207, the front wheel located on the outside of the curve and the rear wheel located on the inside of the curve are employed and the target slip ratio for each wheel is determined as "Stefo" and "Steri" (=0), wherein "e" indicates the oversteer restraining control.

The vehicle side-slip angle $\beta$ and the vehicle side-slip angular velocity $D\beta$ are employed to determine the target slip ratios "Stefo" and "Steri" in accordance with the following equations, respectively:

$$Stefo = K1 \cdot \beta + K2 \cdot D\beta;$$

$$Steri = K3 \cdot \beta + K4 \cdot D\beta;$$

where each of the values K1–K4 is constant for providing the target slip ratio "Stefo" which is for the front wheel located on the outside of the curve and is used for increasing the braking pressure (increasing the control force) and the target slip ratio "Steri" which is for the rear wheel located on the inside of the curve and used for decreasing the braking pressure (decreasing the control force). Therefore, "Steri" is set to be zero when the brake pedal is under the non-operated condition. Each constant K1–K4 is set according to the following equations, respectively:

$$K3 \leq K1/5$$

$$K4 \leq K2/5$$

At step 206, if the understeer restraining control is being performed as well as the oversteer restraining control, the program proceeds to step 208, where the target slip ratio for the front wheel located at the outside of the curve is set as "Stefo", the target slip ratio for the rear wheel located on the inside of the curve is set as "Sturi", and the target slip ratio for the front wheel located on the inside of the curve is set as "Stufi". That is, when both the oversteer restraining control and the understeer restraining control are being performed simultaneously, the target slip ratio of the front wheel located at the outside of the curve is set to be the same ratio as the target slip ratio for use in the oversteer restraining control, while the target slip ratio of the front and rear wheels located on the inside of the curve are set to be the same rates as the target slip ratio for use in the understeer restraining control.

In any case, the rear wheel located on the outside of the curve (a driven wheel of the front-wheel-drive vehicle) is not controlled, because the rear wheel is employed as the reference wheel for use in calculation of the first estimated vehicle speed Vso.

Figure 6A:
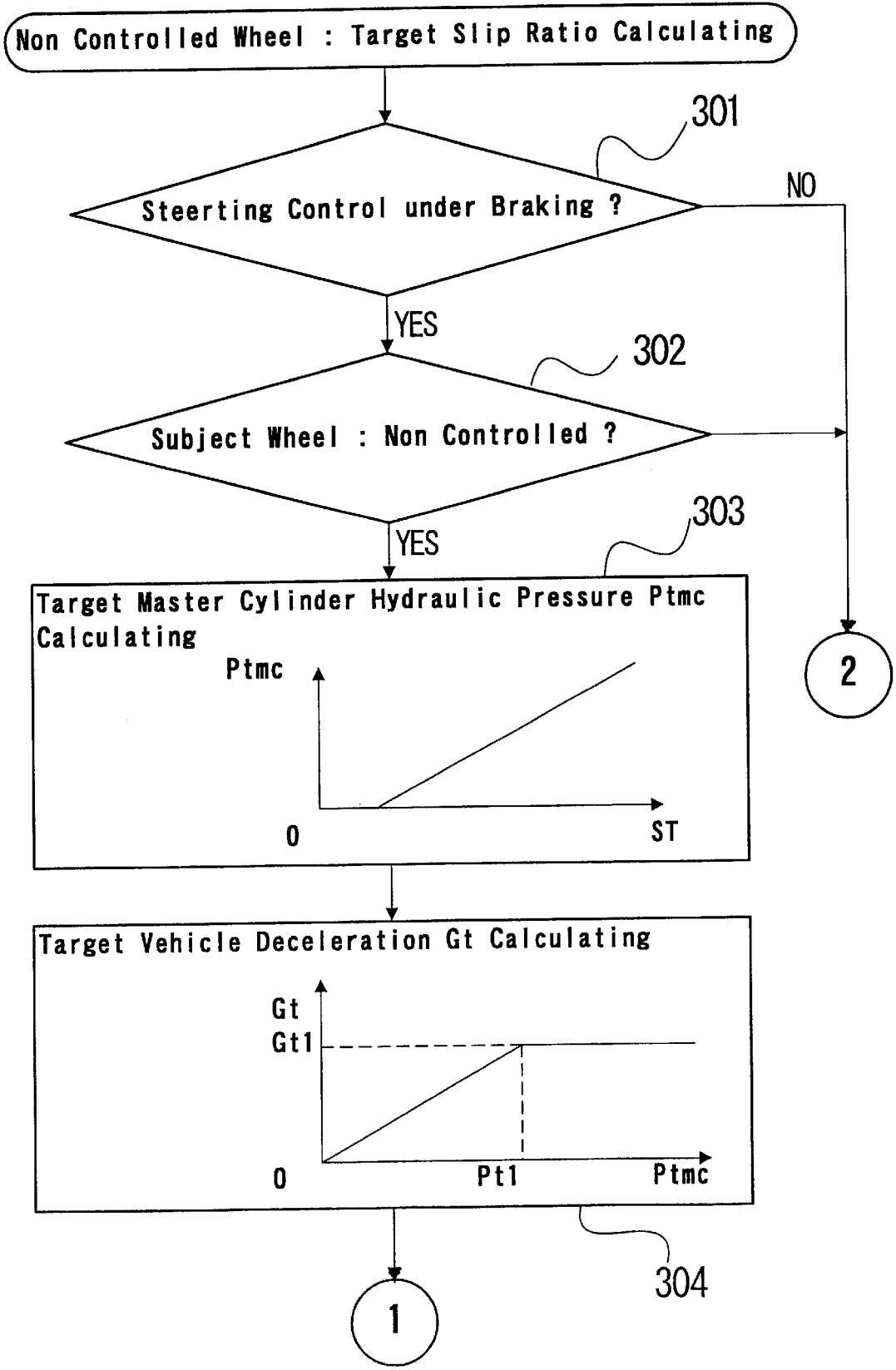
FIGS. 6a and 6b illustrate a flowchart showing the calculation of a target slip ratio for a non-controlled wheel forming a part of the main routine shown in FIG. 4.

Additional details about the operation for calculating the target slip ratio of the non-operated wheel at step 110 in the FIG. 4 flowchart are described below with reference to the flowchart depicted in FIGS. 6a and 6b.

At the outset, the program proceeds to step 301 to determine whether or not the steering control by braking is being performed. That is, the program judges whether or not at least either the oversteer restraining control or the understeer restraining control is being operated. If the steering control by braking is being performed, the program proceeds to step 302 to determine whether or not a subject wheel is the non-controlled wheel. If the subject wheel is the non-controlled wheel, the program proceeds to step 303.

At step 303, a target master cylinder hydraulic pressure Ptmc is calculated on the basis of the stroke ST of the brake pedal BP detected by the brake switch BS. More specifically, the target master cylinder hydraulic pressure Ptmc is set as the master cylinder hydraulic pressure in response to the stroke ST of the brake pedal BP following a map of the stroke-master cylinder hydraulic pressure depicted in FIG. 6a. Next, the program proceeds to step 304, where a target vehicle deceleration Gt is calculated on the basis of the target master cylinder hydraulic pressure Ptmc following a map of the master cylinder hydraulic pressure versus vehicle deceleration rate depicted in FIG. 6a. That is, according to this map, when the target master cylinder hydraulic pressure Ptmc is equal to or less than a predetermined hydraulic pressure Pt1, the target vehicle deceleration Gt is increased in proportion to an increase of the target master cylinder hydraulic pressure Ptmc. When the target master cylinder hydraulic pressure Ptmc is greater than the predetermined hydraulic pressure Pt1, the target vehicle deceleration Gt is maintained as an upper limit (threshold) Gt1.

The program then proceeds to step 305, where a vehicle deceleration deviation $\Delta G$ is calculated on the basis of the target vehicle deceleration which was calculated at step 304 and the estimated vehicle acceleration Dvso which was calculated at step 104, in accordance with the following equation:

$$\Delta G = Gt - |Dvso|$$

The program then proceeds to step 306, where the target slip ratio Stnc of the non-controlled wheel is calculated on the basis of the vehicle deceleration deviation $\Delta G$ following a map of the vehicle deceleration deviation versus the target slip ratio. When the vehicle deceleration deviation $\Delta G$ is set in the following equation:

$$0 < \Delta G \leq \Delta G1 \quad (G1: \text{a positive predetermined value}),$$

the target slip ratio Stnc is increased in proportion to an increase of the vehicle deceleration deviation $\Delta G$. When the vehicle deceleration deviation $\Delta G$ is equal to or greater than G1, the target slip ratio Stnc is set at a positive threshold St1. When the vehicle deceleration deviation $\Delta G$ is set in the following equation:

$$G2 < \Delta G \leq 0 \quad (G2: \text{a negative predetermined value}),$$

the target slip ratio Stnc is set at a positive predetermined slip ratio St2. When the vehicle deceleration deviation $\Delta G$ is set in the following equation:

$$G3 < \Delta G \leq G2 \quad (G3: \text{a negative predetermined value less than } G2),$$

the target slip ratio Stnc is decreased in proportion to a decrease of the vehicle deceleration deviation $\Delta G$. When the vehicle deceleration deviation $\Delta G$ is equal to or less than G3, the target slip ratio Stnc is set at a negative lower limit St3.

When the program judges that the steering control by braking is not being operated at the step 301, and when the program judges that the subject wheel is not the non-controlled wheel at the step 302, the program returns to the main routine denoted in FIG. 4.

Figure 6B:
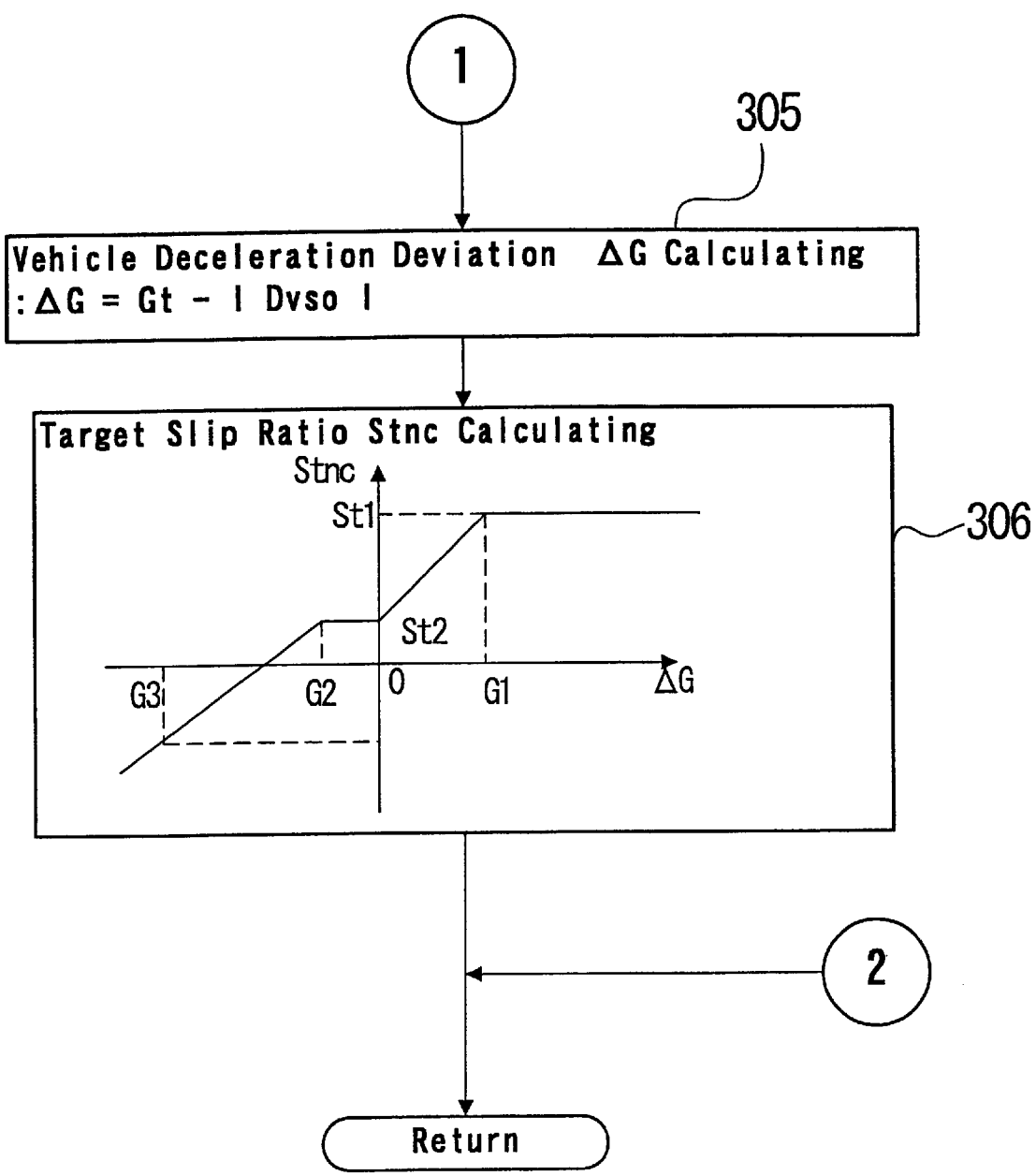
Figure 7:
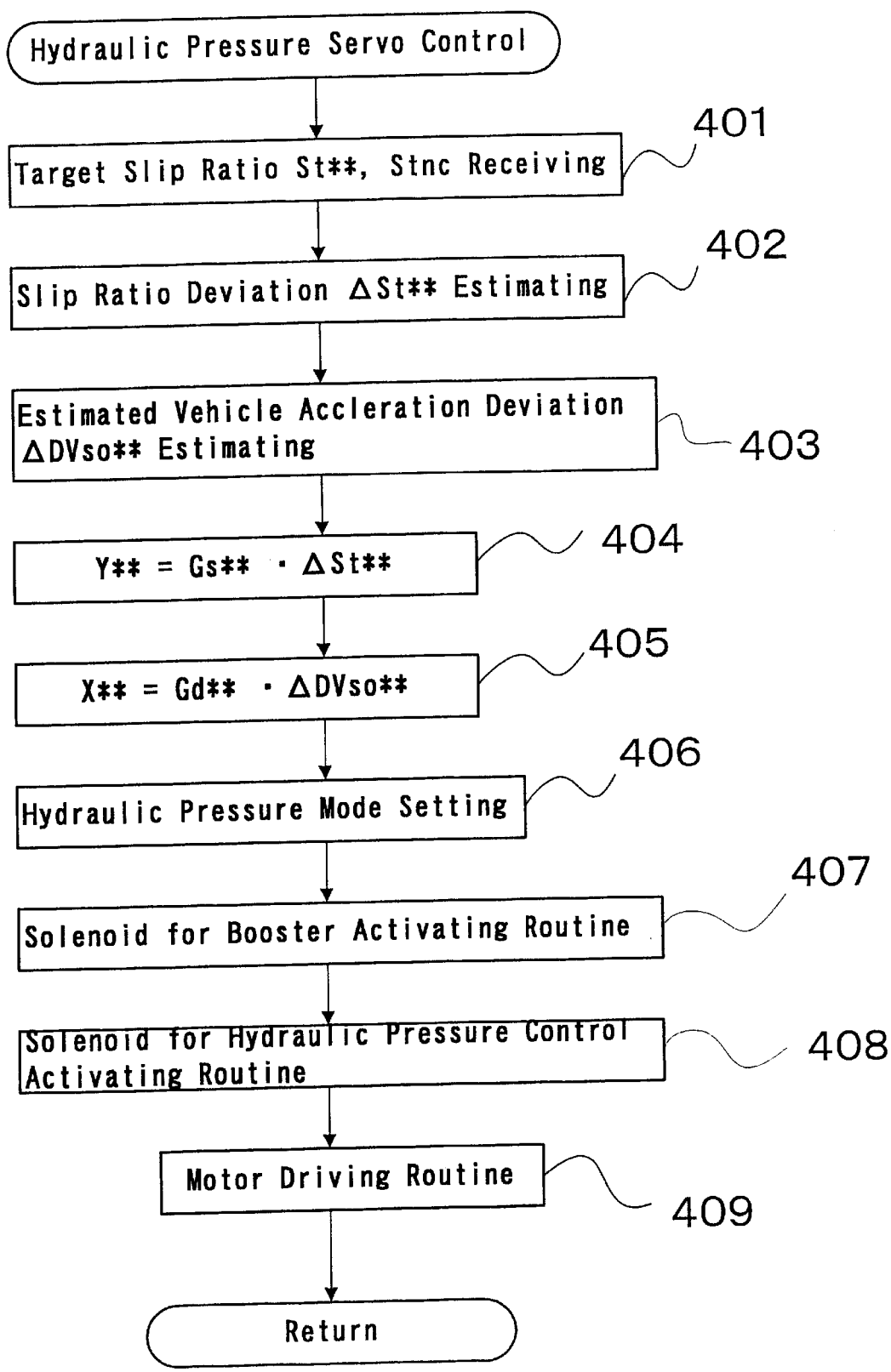
FIG. 7 is a flowchart showing a hydraulic pressure servo control forming a part of the main routine shown in FIG. 4.

The hydraulic pressure servo control performed at the final step 111 in the routine of FIG. 4 is carried out in accordance with the routine shown in FIG. 7. At the outset, at step 104 the electronic control unit ECU receives an input of the target slip ratio ST for the wheels subject to the steering control under braking at steps 205, 207, 208 in FIG. 5 and the target slip ratio Stnc for the wheels which are not subject to being controlled by braking at the step 306 in FIG. 6**.

At step 402, the electronic control unit ECU calculates a target slip ratio deviation $\Delta St^{}$ estimate for the respective wheels, FL, FR, RL, RR. At step 403, the electronic control unit ECU calculates an estimated vehicle acceleration deviation $\Delta DVso^{}$. More specifically, the slip ratio deviation $\Delta St^{}$ is the difference between the target slip ratio $St^{}$ and the actual slip ratio $Sa^{}$. Thus, at step 402, the slip ratio deviation $\Delta St^{}$ for the subject wheel is calculated in accordance with the following equation:

$$\Delta St^{}=St^{}-Sa^{**}.$$

The slip ratio deviation $\Delta St^{**}$ for the wheels which are not subject to being controlled by braking are calculated in accordance with the following equation:

$$\Delta St^{}=Stnc-Sa^{}.$$

Then, at step 403, the estimated vehicle acceleration deviation $\Delta DVso^{}$ is the difference between the estimated vehicle acceleration Dvso and the wheel acceleration $DVw^{}$.

Next, at step 404, the parameter $Y^{**}$ is calculated for providing a hydraulic pressure control in each control mode in accordance with the following equation:

$$Y^{}=Gs^{}\cdot\Delta St^{**} \ (Gs: \text{constant value}).$$

At step 405, another parameter $X^{**}$ is calculated in accordance with the following equation:

$$X^{}=Gd^{}\cdot\Delta Dvso^{} \ (Gd^{}: \text{constant value}).$$

Figure 10:
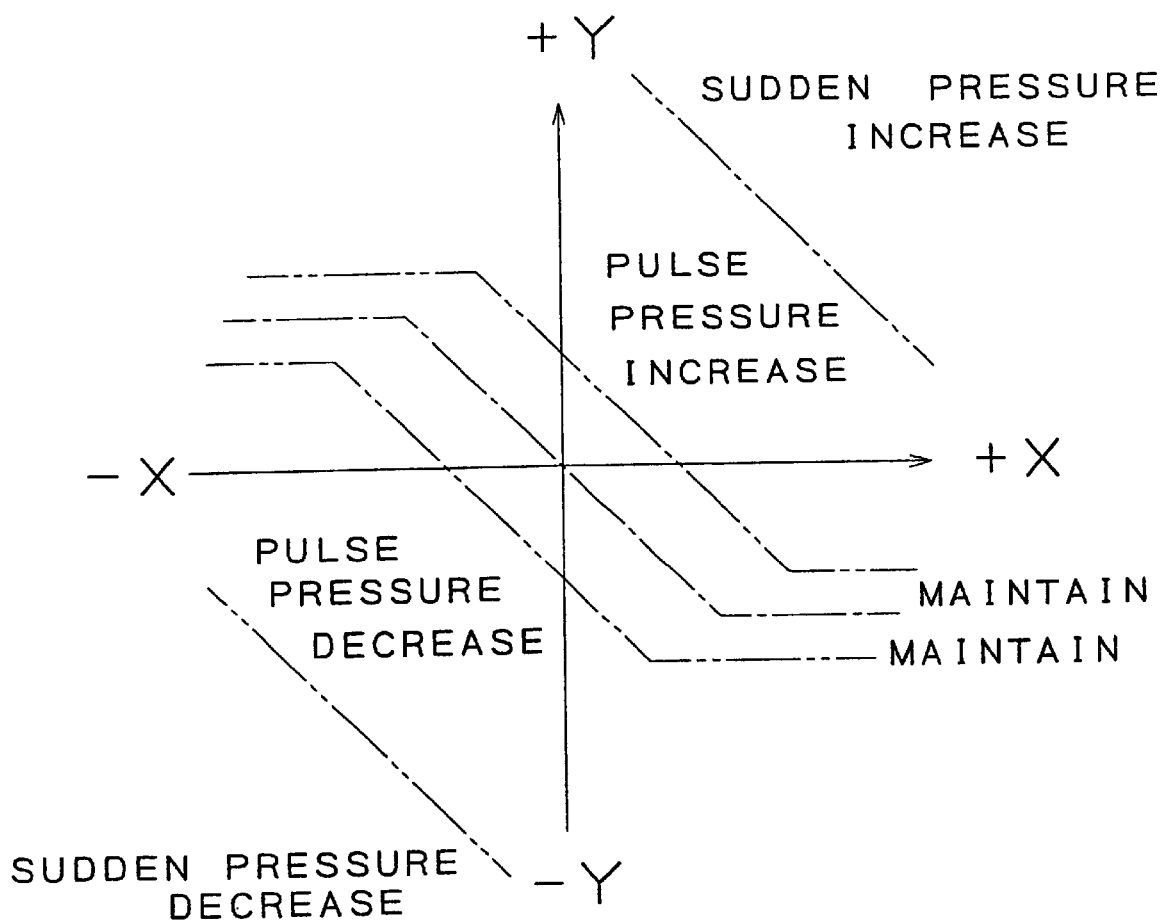
FIG. 10 is a graph showing the relationship between a parameter for use in the brake pressure control and a hydraulic pressure mode according to the present invention.

Then, on the basis of the parameters $X^{}$ and $Y^{}$, a hydraulic pressure mode setting for each wheel is provided at step 406 in accordance with a hydraulic pressure control map as shown in FIG. 10. The control map shown in FIG. 10 has a sudden pressure decreasing zone, a pulse pressure decreasing zone, a pressure holding or maintaining zone, a pulse pressure increasing zone, and a sudden pressure increasing zone which are provided in advance. Therefore, the appropriate one of the zones is selected in accordance with the parameters $X^{}$ and $Y^{}$. That is, the hydraulic pressure mode can be determined not only for the controlled wheel but also for the non-controlled wheel. With respect to the pulse pressure increasing mode and the pulse pressure decreasing mode, a duty ratio to activate a hydraulic pressure control valve is determined. The duty ratio is a ratio of a term of the pressure increasing and a term of the pressure decreasing within a period. With respect to the pulse pressure increasing mode, the duty ratio is increased in accordance with the sudden pressure increasing zone shown in FIG. 10. With respect to the pulse pressure decreasing mode, the duty ratio is increased in accordance with the sudden pressure decreasing zone.

When the vehicle deceleration deviation $\Delta G$ is equal to zero, that is when the estimated vehicle acceleration $|DVso|$ is in accordance with the target vehicle deceleration Gt, the target slip ratio Stnc for the non-controlled wheels is set at the positive predetermined value St1 as shown at step 306 in FIG. 6b, and the target slip ratio deviation $\Delta St^{}$ for the non-controlled wheel is set at a positive value. Accordingly, the hydraulic pressure mode for the non-controlled wheels is set at the pulse pressure increasing mode in accordance with the map in FIG. 10**. Therefore, the wheel brake cylinders for all of the wheels, FL, FR, RL, RR cannot be easily disconnected from the master cylinder while the steering control by braking is being performed. Further, a comfortable pedal stroke is generated when the brake pedal is depressed by a driver while the steering control under braking is being performed.

The hydraulic pressure mode is not determined while the steering control by braking is inactive (all solenoids are off).

Then, the program proceeds to step 407 where the solenoid D1 provided in the booster driving device BD is electrically activated. At step 408, the normally-open type switching valve $PC^{}$ of the hydraulic pressure control valve is controlled corresponding to the hydraulic pressure mode and the duty ratio which are determined at step 406, wherein the hydraulic brake pressure of the wheel cylinders is increased, maintained, or decreased in response to the opening-closing operation of the switching valve $PC^{}$. At a final step 409, the electric motor M is activated. The electric motor M is electrically driven while the steering control by braking is being performed.

As described above, according to the present invention, the target slip ratio Stnc for the non-controlled wheels is determined on the basis of the stroke ST of the brake pedal BP while the steering control by braking is being operated. On the basis of the target slip ratio Stnc, the hydraulic pressure mode of the non-controlled wheel is determined and the hydraulic pressure control valve $PC^{**}$ of the non-controlled wheel is operated for opening and closing. The hydraulic brake pressure of the wheel cylinder for the non-controlled wheel can be adjusted to reach the brake stroke of the brake pedal BP when the brake pedal BP is depressed by the driver while the steering control by braking is being performed. Therefore, a vehicle deceleration can be produced corresponding to the deceleration level required by the driver.

More specifically, while the oversteer restraining control is being operated with the brake pedal being inactive, the front wheel located on the outside of the curve and the rear wheel located on the inside of the curve during the vehicle body turning are set as the non-controlled wheels. In accordance with the increase of the braking force applied to the front wheel located on the outside of the curve, the braking force applied to the rear wheel located on the inside of the curve is set to be zero. While the oversteer restraining control is being operated with the brake pedal being depressed, the braking force applied to the front wheel located on the inside of the curve and the rear wheel located on the outside of the curve is increased corresponding to the stroke of the brake pedal BP, and the braking force applied to the rear wheel located on the inside of the curve is maintained at zero. The braking force for the front wheel located on the outside of the curve is determined as "Bffo", the braking forces which are applied to the front wheel located on the inside of the curve and for the rear wheel located on the outside of the curve after the brake pedal operation are determined as "Bffi" and "Bfro", respectively. A sum of the braking force deviations $\Delta Bfp$ between the left and right wheels before initiation of the brake pedal BP operation is determined as "Bffo". A sum of the braking force deviations $\Delta Bfa$ between the left and right wheels after the depression of the brake pedal BP is calculated in accordance with the following equation:

$$\Delta Bfa=(Bffo+Bfro)-Bffi$$

where $\Delta Bfa$ is equal to "Bffo" because "Bfro" is equal to "Bffi". The sum of the braking force deviations $\Delta Bfa$ after depression of the brake pedal BP is equal to the sum of the braking force deviations $\Delta Bfp$ before initiation of the brake pedal BP operation. Therefore, outward yawing moments (oversteer restraining control moment) which are generated both before the brake pedal operation and after that, can be the same. That is, the oversteer restraining control can be effectively executed after the brake pedal operation as well as before brake pedal operation.

As described above, the outward yawing moment can be maintained when the brake pedal is depressed with the oversteer restraining control being operated. The hydraulic pressure control valve for the non-controlled wheel is controlled for opening and closing in response to the stroke ST of the brake pedal BP.

According to the present invention, the hydraulic pressure generating device is formed with the vacuum booster VB, the booster driving device BD, and the master cylinder MC. However, the hydraulic pressure generating device can be formed with alternative features. For example, the hydraulic pressure generating device can be formed with a hydraulic pressure pump HP, the master cylinder MC, and an electromagnetic switching valve, with the inlet side of the hydraulic pressure pump HP being disconnected from the master cylinder MC by the switching valve when the braking operation is inactive. When the automatic pressure increase control is operated by the steering control under braking, the inlet side of the hydraulic pressure pump HP is connected to the master cylinder MC by the switching valve and an outlet side of the hydraulic pressure pump HP is disconnected from the master cylinder MC by the switching valve. In this case, the brake fluid from the master cylinder MC is drawn in, pressurized by the hydraulic pressure pump HP, and supplied to the wheel cylinder via the hydraulic pressure control valve. Alternatively, the hydraulic pressure generating device can be formed with the accumulator for providing a high-pressure brake fluid.

The brake control device according to the present invention is described for use in the steering control by braking. The brake control device of the present invention can be applicable for use in automatically pressurizing the wheel brake cylinders including traction control and rolling over control (vehicle rolling preventing control).

In addition, the above-described brake control device includes the brake switch BS, although the brake control device can be provided with other sensors for detecting the stroke of the brake pedal BP, including a brake pedal depression sensor.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A brake control device for a vehicle having first and second road wheels comprising:
    a brake pedal;
    a brake pedal operational condition detecting device for detecting an operational condition of the brake pedal;
    first and second wheel brake cylinders responsive to supplied hydraulic pressure for applying brake torque to the first and second road wheels, respectively;
    a hydraulic pressure generating device for generating hydraulic pressure in response to operation of the brake pedal and for generating hydraulic pressure independently of operation of the brake pedal, the hydraulic pressure generating device being hydraulically connected to the first and second wheel cylinders;
    a hydraulic pressure control valve device disposed between the hydraulic pressure generating device and the first wheel brake cylinder for regulating hydraulic pressure in the first wheel cylinder supplied from the hydraulic pressure generating device and disposed between the hydraulic pressure generating device and the second wheel brake cylinder for regulating hydraulic pressure in the second wheel brake cylinder supplied from the hydraulic pressure generating device independently of regulation of hydraulic pressure in the first wheel brake cylinder;
    first control means responsive to vehicle motion under a non-operated condition of the brake pedal for activating the hydraulic pressure generating device and activating the hydraulic pressure control valve device to supply hydraulic pressure to one of the first and second wheel brake cylinders corresponding to one of the first and second road wheels to be controlled in response to the vehicle motion and to regulate hydraulic pressure in the one wheel brake cylinder, and to inhibit supplying hydraulic pressure to the other of the first and second wheel brake cylinders corresponding to the other of the first and second road wheels which is not to be controlled in response to the vehicle motion; and
    second control means responsive to the brake pedal operational condition detected by the brake pedal operational condition detecting device under an activated condition of the pressure control valve device by the first control means, for controlling operation of the hydraulic pressure control valve device to supply hydraulic pressure to the other wheel brake cylinder without obstructing hydraulic pressure regulating performance of the first control means with respect to the one wheel brake cylinder.

2. The brake control device according to claim 1, further comprising:
    vehicle deceleration detecting means for detecting or estimating vehicle deceleration; and
    the second control means including target vehicle deceleration calculating means for calculating a target vehicle deceleration based on the brake pedal operational condition detected by the brake pedal operational condition detecting means, vehicle deceleration comparing means for comparing the target vehicle deceleration calculated by the target vehicle deceleration calculating means with the vehicle deceleration detected or estimated by the vehicle deceleration detecting means, and valve control means responsive to an output by the vehicle deceleration comparing means for controlling operation of the hydraulic pressure control valve device to cause the vehicle deceleration to equal the target vehicle deceleration by regulating hydraulic pressure in the other wheel brake cylinder.

3. The brake control device according to claim 2, wherein the brake pedal operational condition detecting device includes a stroke sensor for detecting the operational stroke of the brake pedal, and the valve control means controls the operation of the hydraulic pressure control valve device to increase hydraulic pressure in the other wheel brake cylinder when the vehicle deceleration becomes equal to the target vehicle deceleration.

4. The brake control device according to claim 1, wherein the first control means includes steering control means for activating the hydraulic pressure control valve device to supply the brake pressure to the one wheel cylinder in accordance with the vehicle motion under an oversteer restraining control or an understeer restraining control when the brake pedal is under the non-operated condition and for applying braking force to a vehicle portion at which the one road wheel is mounted on the vehicle.

5. The brake control device according to claim 1, wherein one of the first and second road wheels serves as a driving road wheel, and the first control means includes a traction control means for activating the hydraulic pressure control valve device to apply the brake torque to the driving road wheel in response to an acceleration slip ratio of the driving road wheel under the brake pedal being non-operated while the vehicle is being accelerated.

6. The brake control device according to claim 1, wherein the hydraulic pressure control valve device includes a first hydraulic pressure control valve disposed between the hydraulic pressure generating device and the first wheel brake cylinder and a second hydraulic pressure control valve disposed between the hydraulic pressure generating device and the second wheel brake cylinder, the second hydraulic pressure control valve being operable independently of operation of the first pressure control valve.

7. The brake control device according to claim 1, wherein the hydraulic pressure generating device includes a reservoir containing brake fluid, a master cylinder for generating hydraulic pressure by increasing pressure of the brake fluid, a fluid pressure booster for activating the master cylinder in response to operation of the brake pedal, a booster driving device for activating the fluid pressure booster independently of the operation of the brake pedal, and a brake pedal remaining mechanism for maintaining the brake pedal at an initial position while the fluid pressure booster is being activated by the booster driving device.

8. The brake control device according to claim 7, wherein the fluid pressure booster is a vacuum booster including a movable wall operatively connected to the master cylinder, a constant pressure chamber defined at a front side of the movable wall and communicated with a vacuum source, a variable pressure chamber defined at a rear side of the movable wall, and a valve mechanism carried by the movable wall and operatively connected to the brake pedal for controlling communication between the constant pressure chamber and the variable pressure chamber and for controlling communication between the variable pressure chamber and atmosphere in response to the brake pedal operation;

the booster driving device including a solenoid carried by the movable wall and operatively connected to the valve mechanism; and the brake pedal remaining mechanism includes a first input member operatively connected to the brake pedal and movable in accordance with the brake pedal operation, and a second input member operatively connected to the valve mechanism, the second member being movable forward with the first input member as a unit to operate the valve mechanism when the brake pedal is operated and being movable forward with the movable wall of the vacuum booster relative to the first input member when the vacuum booster is activated by the booster driving device under the non-operated condition of the brake pedal.

9. A brake control device for a vehicle having first and second road wheels comprising:

a brake pedal;

a brake pedal sensor operatively connected to the brake pedal for detecting an operational condition of the brake pedal;

a first wheel brake cylinder receiving hydraulic pressure to apply brake torque to the first road wheel;

a second wheel brake cylinder receiving hydraulic pressure to apply brake torque to the second road wheel;

a hydraulic pressure generating device which generates both hydraulic pressure in response to operation of the brake pedal and hydraulic pressure independently of operation of the brake pedal, the hydraulic pressure generating device being hydraulically connected to the first and second wheel cylinders;

a first hydraulic pressure control valve disposed between the hydraulic pressure generating device and the first wheel brake cylinder for regulating hydraulic pressure in the first wheel cylinder supplied from the hydraulic pressure generating device;

a second hydraulic pressure control valve disposed between the hydraulic pressure generating device and the second wheel brake cylinder for regulating hydraulic pressure in the second wheel brake cylinder supplied from the hydraulic pressure generating device independently of regulation of hydraulic pressure in the first wheel brake cylinder;

first control means responsive to vehicle motion under a non-operated condition of the brake pedal for activating the hydraulic pressure generating device and activating the first hydraulic pressure control valve device to supply hydraulic pressure to the first wheel brake cylinder of the first road wheel to be controlled in response to the vehicle motion and to regulate hydraulic pressure in the first wheel brake cylinder, and to inhibit supplying hydraulic pressure to the second wheel brake cylinder corresponding to the second road wheel which is not to be controlled in response to vehicle motion;

vehicle deceleration detecting means for detecting or estimating vehicle deceleration;

target vehicle deceleration calculating means for calculating a target vehicle deceleration based on the brake pedal operational condition detected by the brake pedal sensor;

vehicle deceleration comparing means for comparing the target vehicle deceleration calculated by the target vehicle deceleration calculating means with the detected or estimated vehicle deceleration provided by the vehicle deceleration detecting means; and valve control means responsive to an output by the vehicle deceleration comparing means for controlling operation of the second hydraulic pressure control valve device to cause the detected or estimated vehicle deceleration to equal the target vehicle deceleration by regulating hydraulic pressure in the second wheel brake cylinder without obstructing hydraulic pressure regulating performance of the first control means with respect to the first wheel brake cylinder.

10. The brake control device according to claim 9, wherein the brake pedal sensor is a stroke sensor that detects the operational stroke of the brake pedal, and the valve control means controls the operation of the second hydraulic pressure control valve device to increase hydraulic pressure in the second wheel brake cylinder when the estimated or detected vehicle deceleration becomes equal to the target vehicle deceleration.

11. The brake control device according to claim 9, wherein the first control means includes steering control means for activating the hydraulic pressure control valve device to supply the brake pressure to the first wheel cylinder in accordance with the vehicle motion under an oversteer restraining control or an understeer restraining control when the brake pedal is under the non-operated condition and for applying braking force to a vehicle portion at which the first road wheel is mounted on the vehicle.

12. The brake control device according to claim 9, wherein the first road wheel is a driving road wheel, and the first control means includes traction control means for activating the first hydraulic pressure control valve device to apply brake torque to the driving road wheel in response to an acceleration slip ratio of the driving road wheel under the brake pedal being in the non-operated condition while the vehicle is being accelerated.

13. The brake control device according to claim 9, wherein the first hydraulic pressure control valve is operable independently of operation of the second pressure control valve.

14. The brake control device according to claim 9, wherein the hydraulic pressure generating device includes a reservoir containing brake fluid, a master cylinder generating hydraulic pressure by increasing pressure of the brake fluid, a fluid pressure booster for activating the master cylinder in response to operation of the brake pedal, and a booster driving device for activating the fluid pressure booster independently of operation of the brake pedal.

15. The brake control device according to claim 14, wherein the hydraulic pressure generating device also includes a brake pedal remaining mechanism for maintaining the brake pedal at an initial position while the fluid pressure booster is being activated by the booster driving device.

16. The brake control device according to claim 14, wherein the fluid pressure booster is a vacuum booster including a movable wall operatively connected to the master cylinder, a constant pressure chamber defined at a front side of the movable wall and communicated with a vacuum source, a variable pressure chamber defined at a rear side of the movable wall, and a valve mechanism operatively connected to the brake pedal for controlling communication between the constant pressure chamber and the variable pressure chamber and for controlling communication between the variable pressure chamber and atmosphere in response to brake pedal operation.

17. The brake control device according to claim 16, wherein the booster driving device includes a solenoid carried by the movable wall and operatively connected to the valve mechanism.

18. The brake control device according to claim 17, wherein the brake pedal remaining mechanism includes a first input member operatively connected to the brake pedal and movable in accordance with the brake pedal operation, and a second input member operatively connected to the valve mechanism, the second member being movable forward with the first input member as a unit to operate the valve mechanism when the brake pedal is operated and being movable forward with the movable wall of the vacuum booster relative to the first input member when the vacuum booster is activated by the booster driving device under the non-operated condition of the brake pedal.

* * * * *